United States Patent [19]

Bachot et al.

[11] Patent Number: 4,775,551

[45] Date of Patent: Oct. 4, 1988

[54] MICROPOROUS SHAPED ARTICLES

[75] Inventors: Jean Bachot, Bourg la Reine; Jean-Claude Kiefer, Blaincourt les Precy, both of France

[73] Assignee: Rhone-Poulenc Chimie de Base, Courbevoie, France

[21] Appl. No.: 912,375

[22] Filed: Sep. 29, 1986

[30] Foreign Application Priority Data

Sep. 27, 1985 [FR] France ................................ 85 14327

[51] Int. Cl.$^4$ ............................................. B05D 5/12
[52] U.S. Cl. ..................................... 427/58; 427/121; 427/245; 427/335
[58] Field of Search ................. 427/121, 196, 195, 58, 427/204, 245, 335

[56] References Cited

U.S. PATENT DOCUMENTS

| | | | |
|---|---|---|---|
| 3,940,536 | 2/1976 | Pitsch | 427/121 |
| 3,980,613 | 9/1976 | Bachot | 204/296 |
| 4,135,996 | 1/1979 | Bouy | 204/98 |
| 4,204,938 | 5/1980 | Bachot | 204/252 |
| 4,337,117 | 6/1982 | Bodendorf | 162/161 |

*Primary Examiner*—Shrive P. Beck
*Assistant Examiner*—Vi Duong Dang
*Attorney, Agent, or Firm*—Burns, Doane, Swecker & Mathis

[57] ABSTRACT

Controlledly microporous shaped articles adopted for use, e.g., as electrodes and diaphragms, are produced by consolidating a fibrous matrix with a latex binder material, notably by deposition onto a rigid perforate substrate, the lattice network of said binder material comprising a silica-based derivative, e.g., a precipitated or pyrogenic silica.

11 Claims, No Drawings

MICROPOROUS SHAPED ARTICLES

BACKGROUND OF THE INVENTION

Field of the Invention

The present invention relates to a particularly microporous material comprising a stack or array of fibers, consolidated by a latex-based binder. This invention also relates to a process for producing such material and to various applications thereof.

The microporous material or component according to this invention is especially useful for the manufacture of microporous slab electrodes and separators, such as the diaphragms used for electrolysis.

Description of the Prior Art

It is known to this art that, as a general rule, the aforesaid microporous components must satisfy a number of requirements:

(a) they must have a controlled microporosity in respect of pore size and of pore size distribution;

(b) when they are used to fabricate the cathode component of a sodium chloride electrolysis cell, their thickness must be low, on the order of 0.1 mm to 5 mm, and at the same time they must have a high surface area which can exceed several $m^2$.

Furthermore, these microporous materials must be capable of being produced by deposition on a rigid structure characterized by high aperture ratios.

Such microporous materials are typically produced by vacuum filtration of a suspension of fibers and binders.

A difficulty with this method of preparation lies in the fact that a major portion of the binder is introduced in the form of a latex, which latex is removed during the filtering operation.

This results not only in a loss of binder, but also in poor control of the amount which is retained, and, hence, of the consolidation and, ultimately, of the final characteristics of these microporous materials.

In order to introduce the microporosity into such materials, various fillers, such as alkali metal or alkaline earth metal-containing fillers, such as halides, sulfates, sulfites, bisulfites, phosphates, carbonates, bicarbonates, amphoteric alumina or silica, have already been proposed as pore-forming agents.

These pore-forming agents are at least partially removed, depending upon their chemical nature, by an acidic or alkaline medium.

Unfortunately, from a mechanical standpoint, these pore-forming agents have to be considered as factors in the disintegration of the microporous materials.

SUMMARY OF THE INVENTION

Accordingly, a major object of the present invention is the provision of improved microporous substrates, fabricated by utilizing silica-based derivatives as agents for developing the lattice of the latex, and which conspicuously ameliorate those disadvantages and drawbacks to date characterizing the state of this art.

By the term "silica-based derivatives" as utilized herein, there are intended, in particular, the precipitated silicas and the combustion or pyrogenic silicas.

DETAILED DESCRIPTION OF THE PREFERRED EMBODIMENTS OF THE INVENTION

More particularly according to the present invention, these silica derivatives advantageously have a BET specific surface area of from 100 $m^2/g$ to 300 $m^2/g$, and a particle size, evaluated using a Coulter counter, of from 1 to 50 microns and, preferably, from 1 to 15 microns.

In addition, it has been noted that such derivatives behave as excellent pore-forming agents, contributing virtually nothing to the disintegration of the microporous material. These derivatives may be readily removed by digestion in an alkaline medium, in contrast to other pore-formers, such as alumina.

It has now unexpectedly been found, in particular, that, where such microporous materials comprise a fibrous structure consolidated by a latex-based binder, the retention of the particles which constitute the latex is practically complete.

The binder of the microporous materials according to the invention is advantageously a fluoropolymer.

By the expression "fluoropolymer" is intended a homopolymer or a copolymer at least partially derived from olefinic monomers substituted by fluorine atoms or substituted by a combination of fluorine atoms and at least one chlorine, bromine or iodine atom per monomer.

Exemplary of fluoro homopolymers or copolymers, representative are polymers and copolymers derived from tetrafluoroethylene, hexafluoropropylene, chlorotrifluoroethylene and bromotrifluoroethylene.

Such fluoropolymers may also contain up to 75 mole percent of recurring units derived from other ethylenically unsaturated monomers containing at least as many fluorine atoms as carbon atoms, such as, for example, vinylidene (di)fluoride and vinyl perfluoroalkyl ethers, such as perfluoroalkoxyethylenes.

It is obviously envisaged to use several fluoro homopolymers or copolymers such as defined above in accordance with this invention. It too is within the scope of this invention to combine with these fluoropolymers, a small amount, for example, up to 10 or 15% by weight, of polymers whose molecule does not contain fluorine atoms, such as polypropylene, for example.

The fluoropolymer may represent up to 60% of the total weight of the composite, this proportion typically ranging from 5 to 50%.

The fluoropolymer according to the invention is advantageously in the form of an aqueous dispersion (latex) containing, in general, from 30 to 70% of dry polymer, of a particle size distribution of from 0.1 to 5 micrometers, and preferably from 0.1 to 1 micrometer.

The microporous material has a fibrous structure, as aforesaid, comprising conductive or nonconductive fibers consistent herewith. Particularly representative are inorganic fibers, such as asbestos fibers, zirconia fibers, or organic fibers, such as polypropylene fibers or fibers of polyethylene, if appropriate halogenated and, in particular, fluorinated, polyhalovinylidene fibers and especially polyvinylidene fluoride fibers or fluoropolymer fibers.

By "electrically conductive fibers" are intended any material in the form of a filament, the diameter of which is generally less than 1 mm and, preferably from $10^{-5}$ to 0.1 mm, and the length of which is greater than 0.1 mm and, preferably, from 1 to 20 mm, said material having a resistivity equal to or less than 0.4 ohm cm.

Such fibers may be entirely composed of an intrinsically electrically-conductive material; exemplary of such materials, representative are metallic fibers, especially iron, ferrous alloy or nickel fibers, or carbon fibers.

Advantageously, these fibers are carbon fibers, the lengths of which are in a monodisperse distribution.

By "monodisperse distribution" is intended a length distribution such that the length of at least 80%, and advantageously 90% of the fibers, corresponds to that of the mean length of the fibers to within 20%, and advantageously to within 10%.

Fibers can also be used derived from an electrically nonconductive material, but which have been rendered conductive by appropriate treatment: by way of example, representative are asbestos fibers made conductive by a chemical or electrochemical deposition of a metal, such as a nickel, or zirconia ($ZrO_2$) fibers made conductive appropriate treatment; the latter will be carried out under conditions such that the resultant fiber has the aforementioned resistivity.

Of course, two types of fibers may be combined in the microporous materials according to the invention: intrinsically conductive fibers and fibers which have been rendered conductive.

The microporous materials according to the invention are particularly advantageous for fabrication of a cathode component comprising an electrically conductive rigid structure, onto which at least one microporous material is deposited. A slab electrode may be thus manufactured, in particular. By "slab electrode" is intended a metallic rigid support whose function is only to provide the current, and a conductive microporous component which serves as the cathode.

The microporous material according to the invention may also be used as a simple diaphragm. In this case, this component does not comprise conductive fibers.

Finally, this nonconductive microporous component may be coupled directly to a slab cathode, serving as an integral precathode.

One advantage of the present invention is in the formation of the microporous material onto a rigid substrate.

This rigid substrate may be an elementary cathode which has one or more plane surfaces, or has the shape of "glove finger" cylinders having an open surface.

Consistent herewith, the microporous material is formed directly by deposition, onto an open rigid structure, of a suspension containing the binder, the fibers and the silica derivative, followed by drying and sintering and removal of the silica derivative, for example, by electrolytic percolation of sodium hydroxide solution, or directly by electrolysis.

It should be noted, according to the invention, that there results a practically total retention, that is to say, of at least 75% of the latex particles and advantageously of at least 90% of these particles.

In order to further illustrate the present invention and the advantages thereof, the following specific examples are given, it being understood that same are intended only as illustrative and in no wise limitative.

EXAMPLE 1

Production of layers of fibers, consolidated by a PTFE latex, in the presence of silica:

This example demonstrates the effect of silica as an agent for forming the lattice of the latex.

Natural calcium carbonate, alumina and a precipitated silica of similar particle sizes (below 50 micrometers) were used for comparison.

(A) Comparative examples: deposited layers based on asbestos fibers

Preparation of the starting suspension:

| | | |
|---|---|---|
| $H_2O$ = | 3,300 g | |
| Chrysotile asbestos, 1 to 5 mm = | 50 g | ½ hr rotary stirring |
| Chrysotile asbestos, less than 1 mm = | 50 g | |
| Na dioctylsulfosuccinate = | 1 g | |
| Pore-former = | 25 g | |
| PTFE (in the form of latex containing 60% solids) = | 80 to 20 g | ½ hr rotary stirring |

48 hours of standing and restirring before use.

Preparation of the diaphragm was by deposition, under a programmed vacuum, of 460 g of suspension on an asbestos cloth; filtration at $8.10^4$ pascal; drying at 100° C. and sintering by a 7-minute pass in an oven at 360° C.

The PTFE latex retention ratios measured for these components, before removal of the pore-former, are reported in the Table I which follows.

TABLE I

| Nature of the pore-former | Calcium carbonate (<50 μm) | | | Alumina (<50 μm) | | | Silica (<50 μm) | | |
|---|---|---|---|---|---|---|---|---|---|
| PTFE/asbestos ratio in the suspension | 0.8 | 0.4 | 0.2 | 0.8 | 0.4 | 0.2 | 0.8 | 0.4 | 0.2 |
| PTFE/asbestos ratio in the deposited layer | 0.37 to 0.75 | 0.15 to 0.37 | 0.08 to 0.16 | 0.15 to 0.60 | 0.12 to 0.36 | 0.07 to 0.16 | ≧0.77 | ≧0.38 | ≧0.18 |
| Retention ratio | 0.46 to 0.94 | 0.38 to 0.93 | 0.40 to 0.80 | 0.19 to 0.75 | 0.30 to 0.90 | 0.35 to 0.80 | ≧0.96 | ≧0.95 | ≧0.90 |

(B) Comparative examples: deposited layers based on graphite fibers

Preparation of the suspension:

| | | |
|---|---|---|
| Softened $H_2O$ = | 7,000 g | 30 min rotary stirring |
| Graphite wool wadding = | 100 g | |
| PTFE in the form of latex containing 60% of solids = | 80 g | |
| Precipitated silica 1 (diameter = 3 micrometers, BET surface 250 m²/g) = | 100 g | 30 min rotary stirring |

Deposition on asbestos cloth:

After standing for 48 hours, the suspension was restirred before being filtered under the same conditions as in Example 1A.

The reinforcement was measured after removing the pore-former, by dissolving the silica overnight with a stream of electrolyte sodium hydroxide solution at 70° C.

TABLE II

| Graphite fibers | Silica/graphite ratio | PTFE/graphite ratio in suspension | PTFE/graphite ratio in deposit | strengthening after 360° C. |
|---|---|---|---|---|
| Milled 1.0–2.0 mm | 1.0 | 0.80 | 0.60 | good |
| carbon fibers | 0 | 0.80 | <0.05 | none |

EXAMPLE 2

Effect of the silica structure on the degree of retention:

The degree of retention of the PTFE latex in the deposited layer depends substantially both on the specific surface area and on the mean diameter of the silica particles.

The degree of retention, measured during manufacturing runs identical to that described in Example 1A, is reported below:

TABLE III

| Silica type | Coulter diameter, in micrometers | BET surface area ($m^2/g$) | Degree of retention (in %) |
|---|---|---|---|
| Pyrogenic silica | 1.5–2 | 200 | 97–98 |
| Precipitated silica 1 | 3 | 250 | 97–98 |
| Precipitated silica 2 | 3 | 180 | 90 |
| Precipitated silica 3 | 9 | 250 | 92 |
| Precipitated silica 4 | 50 | 250 | 75 |

EXAMPLE 3

Rate of dissolving of the pore-former in an alkaline medium:

When the removal of the pore-former was carried out in an alkaline medium, the silicas dissolved rapidly, whereas the alumina dissolved slowly and incompletely.

Examples comparing silica with alumina:

Dissolving 1 g of pore-former, treated beforehand with electrolytic sodium hydroxide solution (300 ml—70° C.—under stirring) for 1 hour at 360° C.

TABLE IV

| Pore-former type | Percentage dissolved | Time to dissolve |
|---|---|---|
| Alumina | 50% | 6 hours |
| Precipitated silica | 100% | 15 minutes |
| Precipitated silica 1 | 100% | 15 minutes |
| Precipitated silica 2 | 100% | 15 minutes |
| Precipitated silica 3 | 100% | 15 minutes |
| Precipitated silica 4 | 100% | 15 minutes |

EXAMPLE 4

Microporous diaphragm and performance in electrolysis:

The suspension and the deposit were produced as in Example 1.

After detachment from the asbestos cloth used as a filter substrate, the pore-former was removed with a stream of electrolyte sodium hydroxide solution overnight at 70° C. The separator was then installed for electrolysis.

(A) The electrolysis cell used for measuring performance, had the following characteristics and operating conditions:
  (i) Expanded metal anode made of titanium coated with $RuO_2$—$TiO_2$.
  (ii) Rolled woven iron cathode, 2-mm wire, 2-mm opening.
  (iii) Interelectrode distance of 7 mm.
  (iv) Active surface area of ½ $dm^2$—filter-press type cell.
  (v) Current density: 25 $A/dm^2$.
  (vi) Temperature: 85° C.
  (vii) Operation at a constant anode $Cl^-$: 4.8 mol/l.
  (viii) Sodium hydroxide produced: 200 g/l (B) Performance using diaphragms of three types:

| Type A: that described in Example 1 A. | PTFE = 20 $SiO_2$ = 25 |
|---|---|
| Type B: PTFE-enriched | PTFE = 30 $SiO_2$ = 25 |
| Type C: use of $Al_2O_3$ | PTFE = 80 $Al_2O_3$ = 40 |

TABLE V

| Type | PTFE/asbestos (P/A) ratio Suspension | PTFE/asbestos (P/A) ratio Diaphragm | Electrolysis performance U | Electrolysis performance RF % | Electrolysis performance kwh/ton CL |
|---|---|---|---|---|---|
| A | 0.20 | 0.18–0.19 | 3.40 | 85 | 3,020 |
| B | 0.30 | 0.28–0.29 | 3.55 | 86 | 3,120 |
| C | 0.80 | 0.15–0.25 | 3.40 to 3.60 | 84 to 87 | 3,050 to 3,125 |

These results do not reflect any highly significant differences in performance. Nevertheless, they demonstrate the advantage of silica as a pore-former, as compared to alumina:

The nonuniform degree of retention obtained using alumina does not permit the percentage of PTFE present in the deposited layer to be controlled very accurately and renders the hydrophilcity and performance nonuniform;

With the same range of fluoropolymer content, the silica permits, on the other hand, an excellent full control of the composition of the diaphragm and very good uniformity of performance;

Since disintegration of the deposited layers occurs as soon as the PTFE/asbestos ratio falls below 0.15, it was impossible to reduce this ratio below 0.80 in the suspension, when alumna was used as pore-former. Under these conditions, the loss of PTFE can be up to 80%. Because of the problems of economics, recycling of the filtrates becomes essential, with all ensuing problems (readjustment of the suspensions, etc., increase in the weight of equipment, etc.). In the case of silica, the retention was almost complete and the small degree of PTFE losses resulted in filtrates containing very little material, the recycling of which was no longer justified on economic grounds.

EXAMPLE 5

Use of silica for the production of diaphragms having an integral precathode:

This example demonstrates the deposition of a microporous, nonconductive diaphragm, such as described above in Example 4, onto a cathode component comprising an electrically conductive rigid structure. The cathode, as such, covered with a layer which was also deposited and activated, acting as the slab cathode, is referred to as an "integral precathode". This method made it possible to obtain significantly improved performance when the silica was used to produce the precathode. It made it possible, in fact, to better reinforce the conductive fiber layer, while reducing the usage of PTFE latex. It even became possible to avoid the addition of asbestos fibers to the slab electrode and to increase the percentage of activator, without damage to the suspension quality.

(A) Comparative examples: integral precathode diaphragms with and without silica The "precathode" element was fabricated from a rolled and woven iron cathode and a suspension of type I, II, III and IV.

TABLE VI

| Nature of the suspension | Type I | Type II | Type III | Type IV |
|---|---|---|---|---|
| H<sub>2</sub>O | 7,000 g | 7,000 g | 7,000 g | 7,000 g |
| 1-5 mm chrysotile asbestos | 37 g | 0 g | 30 g | 0 g |
| 1-2 mm graphite fibers | 63 g | 100 g | 70 g | 100 g |
| Na dioctylsulfosuccinate | 1 g | 1 g | 1 g | 1 g |
| PTFE (in the form of 60% solids latex) | 80 g | 80 g | 35 g | 35 g |
| Precipitated silica No. 1 | 0 g | 0 g | 100 g | 100 g |
| NiAl activator | 135 g | 135 g | 235 g | 235 g |

The degree of retention of PTFE in the precathode layer is summarized in the Table below:

TABLE VII

| TYPES | Type I | Type II | Type III | Type IV |
|---|---|---|---|---|
| Degree of PTFE retention, in % | 15 to 25% | <5% | 90-95% | 80-90% |

As in the case of the microporous diaphragms, the advantage of the silica was very clear and made it possible to avoid recycling the filtrates in this case as well. With type II there was no reinforcement and any use in electrolysis was thus precluded.

The addition of silica facilitates not only the manufacture, but also the performance in electrolysis. This is readily seen from the results obtained using integral precathode diaphragms (types I, III and IV):

TYPE VIII

| | φ with integral precathode | | | | | | | | |
|---|---|---|---|---|---|---|---|---|---|
| Precathode | | Diaphragm | | Cl<sup>-</sup>a. | NaOH | $U_{1-o}$ | U | RF | kWh/ton |
| Type | kg/m² | P/A | Po/A | kg/m² | Mol/l | g/l | Volts | Volts | % | Cl<sub>2</sub> |
| I | 0.5 | 0.8 | 0.40* | 1.5 | 4.8 | 200 | 2.26 ± 0.02 | 3.35 | 87 ± 1 | 2,907 |
| III | 0.7 | 0.2 | 0.25** | 1.5 | 4.8 | 200 | 2.19 ± 0.02 | 3.20 | 87 ± 1 | 2,778 |
| IV | 0.7 | 0.2 | 0.25** | 1.5 | 4.8 | 200 | 2.19 ± 0.02 | 3.20 | 87 ± 1 | 2,778 |

Pore-former used:
*Al<sub>2</sub>O<sub>3</sub> less than 50 micrometers
**Precipitated silica No. 1
P/A = PTFE/fibers ratio
Po/A = Pore-former/asbestos ratio.
$U_{I-o}$ = electrolysis voltage at 85° C. and I — 0 by extrapolation of the curve U = f (I)

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of a microporous shaped article, which comprises consolidating a fibrous matrix with a latex binder material comprising fluoropolymer particulates, and a silica-based derivative comprising precipitated or pyrogenic silica having a BET specific surface area from 100 m²/g to 300 m²/g and a particle size from 1 to 50 micrometers for developing the lattice of said latex binder.

2. The process as defined by claim 1, the silica having a particle size of from 1 to 15 micrometers.

3. The process as defined by claim 1, said latex binder comprising from 30 to 70% of fluoropolymer solid particulates, the particle size distribution of which ranges from 0.1 to 5 micrometers.

4. The process as defined by claim 1, said fibrous matrix comprising electrically conductive fibers.

5. The process as defined by claim 1, said fibrous matrix comprising electrically nonconductive fibers.

6. The process as defined by claim 4, said electrically conductive fibers comprising monodisperse carbon fibers.

7. The process as defined by claim 1, comprising developing microporosity in said consolidated shaped article by digesting the precipitated or pyrogenic silica therefrom.

8. The process as defined by claim 7, wherein said shaped article is consolidated by depositing said fibrous matrix and latex binder material therefor onto a rigid perforate substrate.

9. The process as defined by claiim 8, comprising filtering said fibrous matrix and latex binder material through said rigid perforate substrate.

10. The process as defined in claim 1, comprising consolidating said fibrous matrix with an unrecycled latex binder material.

11. A process for the production of a microporous shaped article, which comprises consolidating a matrix of electrically conductive fibers with a latex fluoropolymer binder material and a precipitated or pyrogenic silica having a BET specific surface area of from 100 m²/g to 300 m²/g and a particle size of from 1 to 50 micrometers.

* * * * *